(12) United States Patent
Sundaram et al.

(10) Patent No.: US 11,249,861 B2
(45) Date of Patent: Feb. 15, 2022

(54) MULTI-LAYERED DISASTER RECOVERY MANAGER

(71) Applicant: Bank of America Corporation, Charlotte, NC (US)

(72) Inventors: Vaasudevan Sundaram, Chennai (IN); Samrat Bhasin, Bangalore (IN); MadhuSudhanan Krishnamoorthy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 107 days.

(21) Appl. No.: 16/783,902

(22) Filed: Feb. 6, 2020

(65) Prior Publication Data

US 2021/0248042 A1  Aug. 12, 2021

(51) Int. Cl.
| | |
|---|---|
| G06F 11/14 | (2006.01) |
| G06F 11/07 | (2006.01) |
| G06F 11/32 | (2006.01) |
| G06K 9/62 | (2006.01) |
| G06N 20/00 | (2019.01) |

(52) U.S. Cl.
CPC ...... *G06F 11/1464* (2013.01); *G06F 11/0766* (2013.01); *G06F 11/1451* (2013.01); *G06F 11/1461* (2013.01); *G06F 11/1469* (2013.01); *G06F 11/1471* (2013.01); *G06F 11/326* (2013.01); *G06K 9/6256* (2013.01); *G06N 20/00* (2019.01); *G06F 2201/84* (2013.01)

(58) Field of Classification Search
CPC ............. G06F 11/1464; G06F 11/326; G06F 11/1451; G06F 11/0766; G06F 11/1461; G06F 11/1471; G06F 11/1469; G06F 2201/84; G06N 20/00; G06K 9/6256

USPC ......................................................... 711/162
See application file for complete search history.

(56) References Cited

U.S. PATENT DOCUMENTS

| | | |
|---|---|---|
| 7,676,692 B2 | 3/2010 | Costlow et al. |
| 7,725,441 B2 | 5/2010 | Balasubramanian et al. |
| 8,984,326 B2 | 3/2015 | Phan |

(Continued)

OTHER PUBLICATIONS

Kowsari, Kamran; Heidarysafa, Mojtaba; Brown, Donald; Jafari Meimandi, Kiana; Barnes, Laura; RMDL: Random Multimodel Deep Learning for Classification. https://doi.org/10.13140/rg.2.2.22172.39046, May 2018.

*Primary Examiner* — Yair Leibovich (57) ABSTRACT

A system includes a production server, a backup server, a telemetry analyzer, a memory, and a hardware processor. The telemetry analyzer takes snapshots of various performance metrics of the production server. The memory stores a log of previous disasters that occurred on the production server. The log includes a snapshot of the production server performance metrics from the time each disaster occurred. The memory also stores recovery scripts for each logged disaster. Each script provides instructions for resolving the linked disaster. The hardware processor uses a machine learning architecture to train an autoencoder. The trained autoencoder receives new snapshots from the telemetry analyzer and generates a reconstruction of the new snapshots. The hardware processor then determines a threshold for distinguishing between server disasters and minor anomalies. This distinction is made by comparing the difference between the reconstruction of the new snapshots and the new snapshots with the threshold.

20 Claims, 3 Drawing Sheets

(56) References Cited

U.S. PATENT DOCUMENTS

| | | | |
|---|---|---|---|
| 9,262,290 | B2 | 2/2016 | Iwasaki et al. |
| 9,274,903 | B1 | 3/2016 | Garlapati et al. |
| 9,396,052 | B2 | 7/2016 | Sampath et al. |
| 9,405,666 | B2 * | 8/2016 | Kruglick ................. G06F 11/36 |
| 10,255,138 | B2 | 4/2019 | Sharma et al. |
| 10,373,056 | B1 | 8/2019 | Andoni et al. |
| 10,412,155 | B2 | 9/2019 | Kumar et al. |
| 10,445,652 | B2 | 10/2019 | Kurniadi et al. |
| 10,445,738 | B1 | 10/2019 | Waters et al. |
| 2017/0032343 | A1 | 2/2017 | Kurniadi et al. |
| 2017/0126795 | A1 | 5/2017 | Kumar et al. |
| 2018/0139271 | A1 | 5/2018 | Kumar et al. |
| 2018/0165554 | A1 | 6/2018 | Zhang et al. |
| 2018/0204111 | A1 * | 7/2018 | Zadeh ................. G06N 3/0436 |
| 2018/0314971 | A1 | 11/2018 | Chen et al. |
| 2019/0026473 | A1 | 1/2019 | Carroll et al. |
| 2019/0026475 | A1 | 1/2019 | Carroll et al. |
| 2019/0026651 | A1 | 1/2019 | Carroll et al. |
| 2019/0026665 | A1 | 1/2019 | Caskey et al. |
| 2019/0028289 | A1 | 1/2019 | Saxena et al. |
| 2019/0028492 | A1 | 1/2019 | Coleman et al. |
| 2019/0095300 | A1 | 3/2019 | Oba |
| 2019/0102675 | A1 | 4/2019 | Biswas et al. |
| 2019/0156245 | A1 | 5/2019 | Jan |
| 2019/0205765 | A1 | 7/2019 | Mondello et al. |
| 2019/0220758 | A1 | 7/2019 | Talyansky et al. |
| 2019/0228312 | A1 | 7/2019 | Andoni et al. |
| 2019/0311552 | A1 | 10/2019 | Zhang et al. |
| 2020/0004266 | A1 | 1/2020 | Eoh et al. |
| 2020/0012918 | A1 | 1/2020 | Malhotra et al. |
| 2020/0027211 | A1 | 1/2020 | Dufort |

\* cited by examiner

FIG. 4

MULTI-LAYERED DISASTER RECOVERY MANAGER

TECHNICAL FIELD

This disclosure relates generally to server maintenance. More specifically, this disclosure relates to systems and methods of recovering servers following a disaster.

BACKGROUND

Servers and databases store and use information used by applications. In some instances, the servers and databases encounter events (characterized as disastrous events) that result in the information on the servers and databases being destroyed in some manner. For example, the servers and databases may encounter a crash, an intrusion, and/or an external force that causes the information to be destroyed and/or to become inaccessible.

SUMMARY OF THE DISCLOSURE

Servers and databases store and use information used by applications. In some instances, the servers and databases encounter events characterized as disastrous events that result in the information on the servers and databases being destroyed in some manner. For example, the servers and databases may encounter a crash in which the disks or drives that store the information become inoperable. As a further example, the server may experience a cache contention, which occurs when multiple threads of a program attempt to access a shared memory cache concurrently. As another example, the server may experience a NUMA latency, which arises in Non-Uniform Memory Access (NUMA) architecture due to a mismatch between where data is placed in memory versus the CPU threads accessing it. In each of these events, the information on the server and/or database becomes inaccessible or the server otherwise crashes.

To protect against data loss and/or damage, users may implement a form of data redundancy. For example, users may implement backup servers and backup databases that keep redundant copies of the data and/or information stored in the servers and databases. When the servers and databases are damaged and/or compromised, the users may restore data from the backup servers and databases.

Successful use of these redundant systems depends on the user's ability to detect that a disastrous event occurred, identify the cause of the disastrous event, identify an appropriate solution, and implement the solution on the system. This can be a time-consuming process fraught with error. Because of the variety of forms and frequencies of software regressions, it is practically impossible to exhaustively identify every type of disaster. Further, the ability to manually probe a server for defects is limited by the programming skill of the system user. It creates the possibility of having different users implementing different fixes for the same error. These layered changes can themselves create new disasters. Additionally, profiling the software running on the server via code instrumentation may cause perturbation in the software program's run-time behavior. This is especially true for parallel software, where contention signatures can be significantly altered due to the most minute probe effect.

According to one embodiment, a system includes a production server, a backup server, a first hardware processor coupled to a first memory, a second memory, and a second hardware processor coupled to a third memory. The production server runs software applications. The backup server is a copy of the production server. The first hardware processor monitors various performance metrics of the production server. This is accomplished by taking snapshots of the status of various hardware performance metrics. The first hardware processor can send the snapshots to other elements of the system. The second memory is configured to store a log of previous disasters that occurred on the production server. The log includes a list of previous disasters. For each disaster, the log includes the snapshot of the hardware performance metrics of the production server at the time the disaster occurred. The second memory is also configured to store a set of recovery scripts. Each recovery script is linked to a disaster in the log. Each script provides instructions for resolving the linked disaster. The second hardware processor is configured to analyze the snapshots taken by the first hardware processor. Analysis of the snapshots entails using a machine learning architecture to generate a set of features of the snapshots that indicate that the server is functioning normally. The second hardware processor is also configured to train autoencoders using the set of features generated by the machine learning architecture. The trained autoencoder takes new snapshots received from the first hardware processor and generates a reconstruction. The second hardware processor is further configured to determine a threshold for distinguishing between server disasters and minor anomalies. This distinction is made by comparing the reconstruction of the new snapshots to the new snapshots. The degree of difference between the new snapshots and their reconstructions is then compared to the threshold. When the threshold is exceeded, the second hardware processor is configured to compare the new snapshot with the log of previous disasters to find a scenario with the closest match between the hardware performance metrics in the new snapshot and the hardware performance metrics associated with a disaster in the log. The second hardware processor is also configured to retrieve and execute a recovery script associated with the closest matched scenario.

According to another embodiment, a method includes receiving snapshots of a production server's telemetry. The snapshots include the status of various hardware performance metrics from the production server at the time the snapshot was taken. The method also includes using a machine learning architecture to generate a set of features of the snapshots that indicate that the server is functioning normally. The method also includes training autoencoders using the set of features generated by the machine learning architecture. The trained autoencoders are used to generate a reconstruction of newly received snapshots. The method further includes distinguishing between server disasters and minor anomalies by comparing the difference between the new snapshot and the reconstruction of the new snapshot to a threshold. When the threshold is exceeded, the method also includes comparing the new snapshot to a log of previous disasters. The log of previous disasters includes, for each disaster in the log, a list of hardware performance metrics as those metrics were captured in a snapshot taken at the time of the disaster. The objective of this comparison step is to find a scenario with the closest match between the hardware performance metrics in the new snapshot and the hardware performance metrics in a snapshot in the log. The method further includes retrieving a recovery script that is linked to the closest matched scenario in the log. The recovery script includes computer executable instructions for resolving the scenario. The method also includes executing the retrieved recovery script.

According to a further embodiment, an apparatus includes a memory and a hardware processor. The processor is linked to the memory, and the memory stores executable instructions. The hardware processor is configured to use a machine learning architecture to process snapshots of a production server's telemetry. The snapshots include the status of a plurality of hardware performance metrics. In processing the snapshots, the hardware processor generates a set of features from the snapshots that indicate that the server is functioning normally. The hardware processor is also configured to train autoencoders using the set of features generated by the machine learning architecture. The trained autoencoders generate a reconstruction of new snapshots that are received by the apparatus. The hardware processor is configured to distinguish server disasters from minor anomalies by comparing the difference between the new snapshots and their reconstructions to a threshold. When the threshold is exceeded, the hardware processor is configured to compare the new snapshot to a log of previous disasters. The log of previous disasters includes, for each disaster in the log, a list of hardware performance metrics as those metrics were captured in a snapshot taken at the time of the disaster. The objective of this comparison step is to find a scenario with the closest match between the hardware performance metrics in the new snapshot and the hardware performance metrics in a snapshot in the log. The hardware processor is further configured to retrieve a recovery script that is linked with the closest matched scenario found in the log. The recovery script includes computer executable instructions for resolving the scenario. Additionally, the hardware processor is configured to execute the retrieved recovery script.

Certain embodiments provide one or more technical advantages. For example, one embodiment monitors server operations using a combination of various hardware performance counters (HPCs), which enables the disclosed example to generalize to any regression pattern. This significantly reduces the effects to contention signatures that occur using other methods. The need to label training data for the autoencoders is eliminated in certain embodiments by leveraging multimodal deep learning architectures. These embodiments are able to more accurately identify server disasters because a statistical heuristic is applied for thresholding the autoencoders' reconstruction error analysis. The system described in the present disclosure may particularly be integrated into a practical application of a disaster recovery manager for use by an organization to improve the performance of their server networks, as compared to traditional servers operating without the disaster recovery manager. In particular, the disaster recovery manager may be used to continuously monitor one or more servers to automatically detect and correct server disasters before the disaster crashes the network. The disaster recovery manager may also automatically provision backup resources in real-time so that vital network functions are not delayed. Without the disaster recovery manager, the lag in disaster detection and backup provision creates network bottlenecks.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1-4 of the drawings, like numerals being used for like and corresponding parts of the various drawings.

Figure 1:
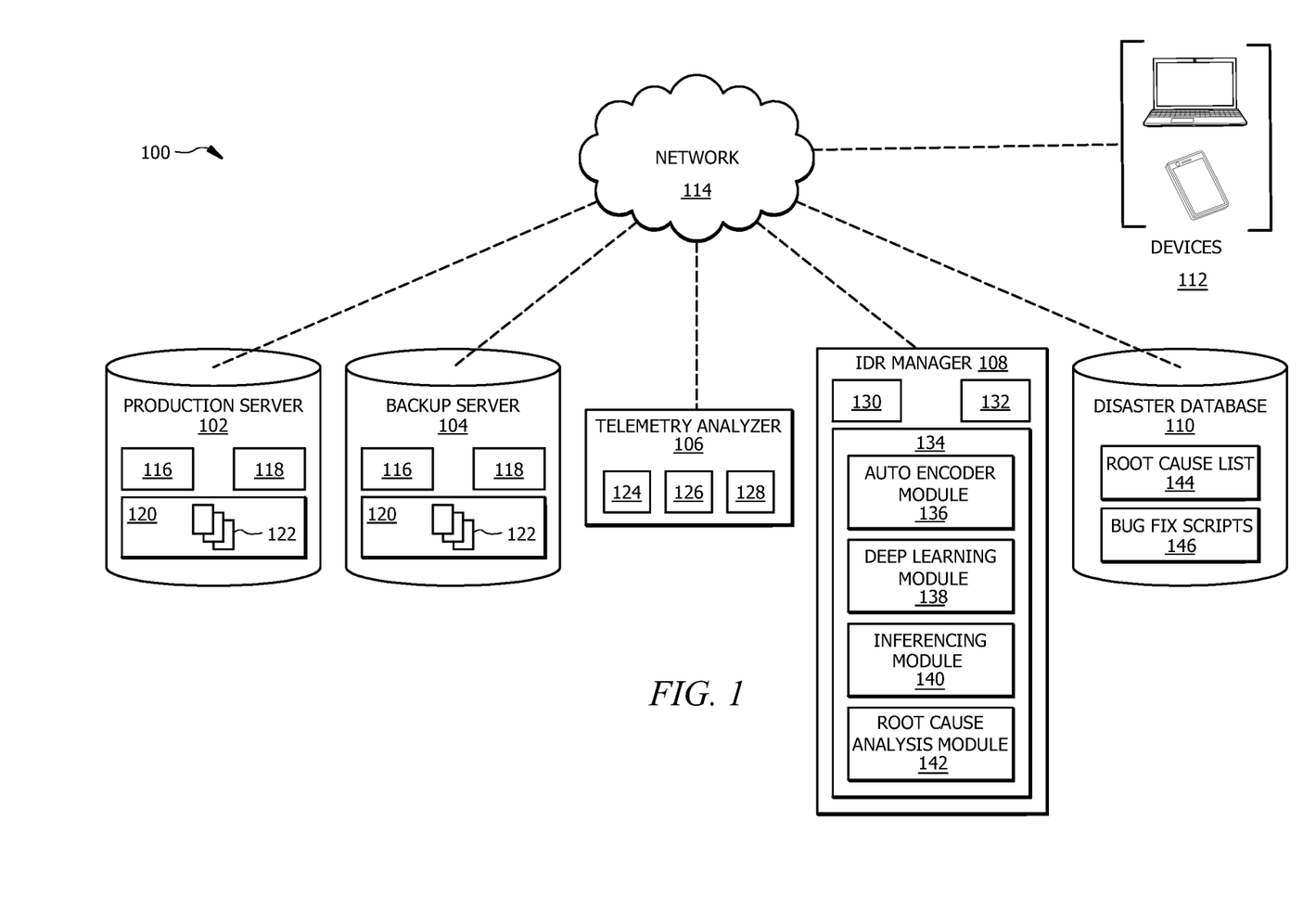
FIG. 1 illustrates an example system incorporating an intelligent disaster recovery manager.

FIG. 1 illustrates an example system 100 for managing disaster recovery. The example system 100 includes a production server 102, backup server 104, telemetry analyzer 106, Intelligent Disaster Recovery (IDR) Manager 108, disaster database 110, and devices 112 that are each in signal communication with the other components of system 100 through network 114. Generally, telemetry analyzer 106, IDR Manager 108, and disaster database 110 operate together to facilitate the transfer of operations from production server 102 to backup server 104 if production server 102 encounters a disaster.

Production server 102 includes any number of servers and/or databases that store and use information used by software applications. In certain embodiments, production server 102 includes a processor 116, network interface 118, and memory 120.

Processor 116 communicatively couples to network interface 118 and memory 120. Processor 116 controls the operation and administration of production server 102 by processing information received from network interface 118 and memory 120. Processor 116 includes any hardware and/or software that operates to control and process information. Processor 116 may be a programmable logic device, a microcontroller, a microprocessor, any suitable processing device, or any suitable combination of the preceding. For example, the processor 116 may be 8-bit, 16-bit, 32-bit, 64-bit or of any other suitable architecture.

While system 100 depicts a single production server 102, various embodiments may operate using any number of production servers. In addition, various embodiments may incorporate the functionality and/or hardware of production server 102 in other servers, computers, or networks. In particular embodiments, production server 102 would be located on an enterprise or protected network. In certain embodiments, access to production server 102 may be limited to a private network while in other embodiments production server 102 may be accessed from a public communication network such as the Internet.

Network interface 118 represents any suitable device operable to receive information from network 114, perform suitable processing of the information, communicate to other devices, or any combination of the preceding. Network interface 118 represents any port or connection, real or virtual, including any suitable hardware and/or software, including protocol conversion and data processing capabilities, to communicate through a LAN, WAN, or other communication systems that allows production server 102 to exchange information with other components of system 100.

Memory 120 stores, either permanently or temporarily, data, operational software, or other information for processor 116. Memory 120 includes any one or a combination of volatile or nonvolatile local or remote devices suitable for storing information. For example, memory 120 may include random access memory (RAM), read only memory (ROM), magnetic storage devices, optical storage devices, or any other suitable information storage device or a combination of these devices. In certain embodiments, memory 120 includes a plurality of applications 122. Applications 122 are software applications that may receive input from devices 112. While illustrated as including particular modules, memory 120 may include any suitable information for use in the operation of production server 102.

Backup server 104 is a copy of production server 102. It may be deployed in place of production server 102 if production server 102 crashes or otherwise experiences performance disruptions. In certain embodiments, backup server 104 includes a processor 116, network interface 118, and memory 120. The processor 116, network interface 118, and memory 120 perform the same functions in the backup server 104 as they do in the production server 102. The pictured applications 122 stored on the memory 120 of the backup server 104 are copies of the applications 122 stored on the memory 120 of the production server 102. The components of production server 102 and backup server 104 are numbered the same to represent that backup server is a copy of production server 102. The processor 116, network interface 118, and memory 120 of production server 102 may be physically distinct from the processor 116, network interface 118, and memory 120 of backup server 104.

The relationship between production server 102 and backup server 104 is explained in more detail below with respect to FIG. 2.

Telemetry analyzer 106 generally collects hardware telemetric data from the production server 102. Telemetric data generally relates to the use and performance of applications 122 and hardware components of production server 102. For example, such data may include how often certain features are used, measurements of start-up time and processing time, application crashes, and general usage statistics. Highly detailed data can be reported, such as individual window metrics, counts of used features, and individual function timings.

In some embodiments, telemetry analyzer 106 includes a processor 124, memory 126, and network interface 128. The processor 124 communicatively couples to memory 126 and network interface 128. Processor 124 controls the operation and administration of telemetry analyzer 106 by processing information received from memory 126 and network interface 128. Processor 124 includes any hardware and/or software that operates to control and process information. Processor 124 may be a programmable logic device, a microcontroller, a microprocessor, any suitable processing device, or any suitable combination of the preceding. For example, the processor 124 may be 8-bit, 16-bit, 32-bit, 64-bit or of any other suitable architecture.

Processor 124 is configured to collect hardware telemetric data by, for example, reading a plurality of hardware performance counters (HPCs) from a production server 102. HPCs are registers in a processor that store counts of various hardware related activities. For example, the HPCs may include a list of instructions executed, cycles elapsed, cache hits, cache misses, branch predictions, or branch mispredictions. One skilled in the art would recognize that different counters may be selected. These counts provide a lightweight means for collecting profiling information without having to modify source code. The processor 124 is further configured to transmit the hardware telemetric data to an IDR manager 108 for further processing as discussed below in FIG. 2.

The IDR Manager 108 generally uses multi-modal deep learning and trained autoencoders to identify disasters on the production server 102, determine the root cause of the disaster, and implement an automated script to fix the disaster. In some embodiments, the IDR Manager 108 includes a processor 130, network interface 132, and memory 134. The processor 130 communicatively couples to network interface 132 and memory 134. Processor 130 controls the operation and administration of IDR Manager 108 by processing information received from network interface 132 and memory 134. Processor 130 executes software stored on memory 134 to perform any of the functions described herein. Processor 130 includes any hardware and/or software that operates to control and process information. Processor 130 may be a programmable logic device, a microcontroller, a microprocessor, any suitable processing device, or any suitable combination of the preceding. For example, the processor 130 may be 8-bit, 16-bit, 32-bit, 64-bit or of any other suitable architecture.

Network interface 132 represents any suitable device operable to receive information from network 114, perform suitable processing of the information, communicate to other devices, or any combination of the preceding. Network interface 132 represents any port or connection, real or virtual, including any suitable hardware and/or software, including protocol conversion and data processing capabilities, to communicate through a LAN, WAN, or other communication systems that allows IDR Manager 108 to exchange information with the other components of system 100.

Memory 134 stores, either permanently or temporarily, data, operational software, or other information for processor 130. Memory 134 includes any one or a combination of volatile or nonvolatile local or remote devices suitable for storing information. For example, memory 134 may include random access memory (RAM), read only memory (ROM), magnetic storage devices, optical storage devices, or any other suitable information storage device or a combination of these devices. While illustrated as including particular modules, memory 134 may include any suitable information for use in the operation of IDR Manager 108.

In certain embodiments, memory 134 includes several software modules executable by processor 130. For example, the memory 134 may include an autoencoder module 136, deep learning module 138, inferencing module 140, and root cause analysis module 142. The autoencoder module 136 generally predicts the type of telemetric data of production server 102 that is normal or abnormal. More detail regarding the operation of autoencoder module 136 is provided below with respect to FIGS. 2 and 4. Deep learning module 138 is generally a multi-modal machine learning architecture that helps train the autoencoder module 136. Further explanation of the autoencoder training by deep learning module 138 is provided below with respect to FIGS. 2 and 3. Inferencing module 140 generally determines if a disaster occurred by comparing incoming telemetric data from the production server 102 with the predictions made by autoencoder module 136. Root cause analysis module 142 generally identifies the cause of a disaster scenario that is detected by inferencing module 140. This is accomplished by comparing the telemetric data to data stored in a disaster database 110. The root cause analysis module 142 is also responsible for selecting a bug fix script to remedy the disaster. Detailed explanation of the operation of inferencing module 140 and root cause analysis module 142 is provided with respect to FIG. 2.

Disaster database 110 is generally configured to communicate with IDR Manager 108 through network 114. The primary role of database 110 is to store information for use by the various modules executed by IDR Manager 108. In certain embodiments, the disaster database 110 stores a root cause list 144 and repository of bug fix scripts 146. The root cause list 144 is a database of previous disasters that occurred on a production server 102 and the telemetric data that was recorded when the disaster occurred. As will be explained in the context of FIG. 2, the root cause analysis module 142 searches the root cause list 144 to determine what caused a disaster after the inferencing module 140 determines that a disaster occurred. The bug fix scripts 146 are instructions to execute on production server 102 and backup server 104 to remedy the disaster that occurred on production server 102. Bug fix scripts 146 may comprise processor executable revisions to the applications 122, or they may simply comprise sending a message to a user for manual intervention. Bug fix scripts 146 may also comprise updates to any operating system or other software infrastructure on servers 102 and 104. Additional detail regarding bug fix scripts 146 and their role in the operation of system 100 is provided below with respect to FIG. 2.

Devices 112 are any devices capable of communicating with other components of system 100. For example, device 110 may execute applications that use information stored on production server 102. Devices 112 may also write data to production server 102. Devices 110 may be any appropriate device for sending and receiving communications over network 114. As an example, and not by way of limitation, device 112 may be a computer, a laptop, a wireless or cellular telephone, an electronic notebook, a personal digital assistant, a tablet, or any other device capable of receiving, processing, storing, and/or communicating information with other components of system 100. Device 112 may also include a user interface, such as a display, a microphone, keypad, or other appropriate terminal equipment capable of receiving input from a user.

Figure 2:
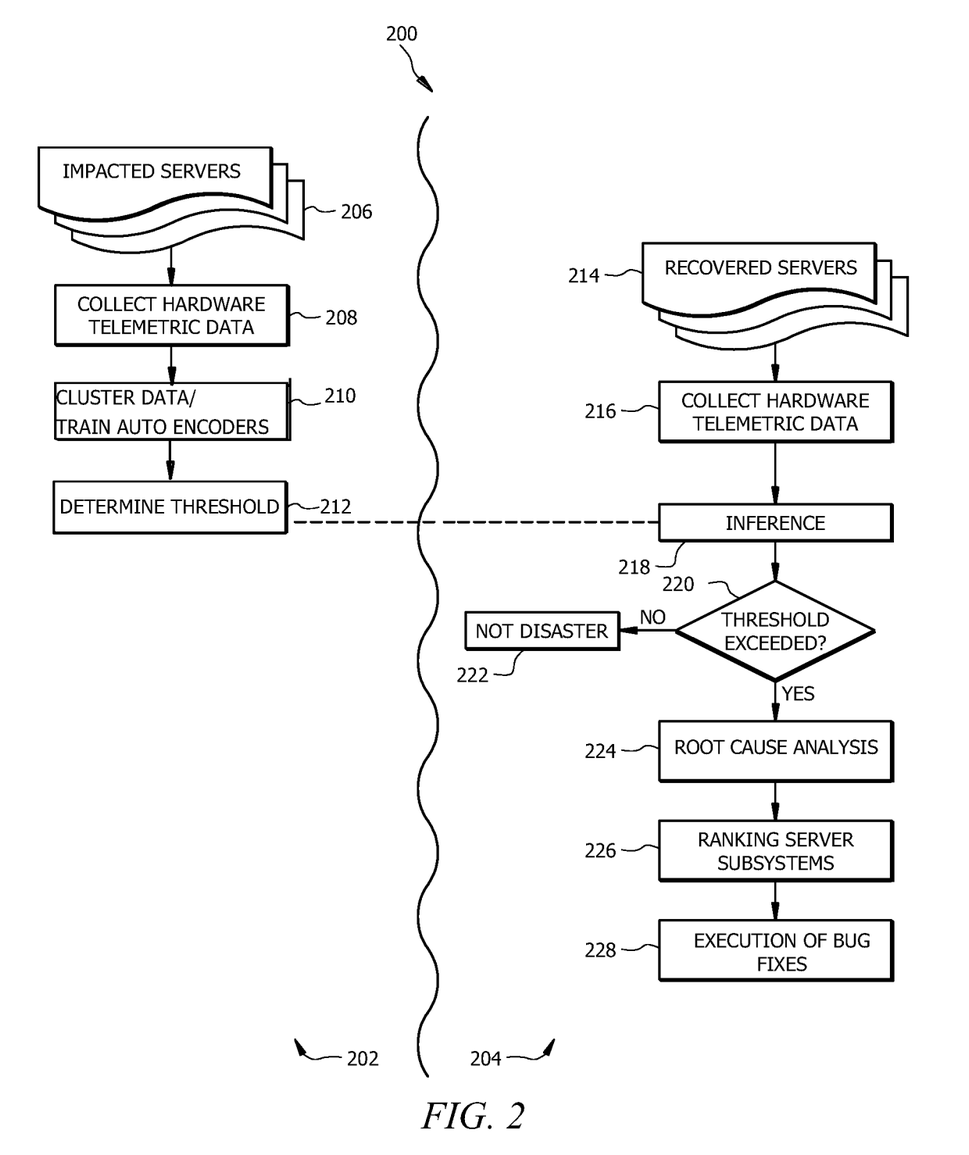
FIG. 2 is a flowchart illustrating a method of using an intelligent disaster recovery manager.

FIG. 2 illustrates an example method 200 for using an IDR manager 108 in a system like the system 100 illustrated in FIG. 1. The example method 200 comprises two parallel processes that may operate simultaneously. The machine learning process 202 is a continuous training protocol that analyzes cases of server disasters. Recovery process 204 generally uses data generated in learning process 202 to identify server disasters and correct them.

Machine learning process 202 may involve a plurality of impacted servers 206. The impacted servers 206 are examples of the production server 102 pictured in FIG. 1. The impacted servers 206 may experience disasters simultaneously or at different times. Alternatively, impacted servers 206 may be separate disasters on a single production server 102. Step 208 is carried out whenever a disaster occurs. At step 208, a telemetry analyzer 106 collects hardware telemetric data from the plurality of impacted servers 206. The telemetry analyzer 106 sends the collected hardware telemetric data to an IDR Manager 108.

Figure 3:
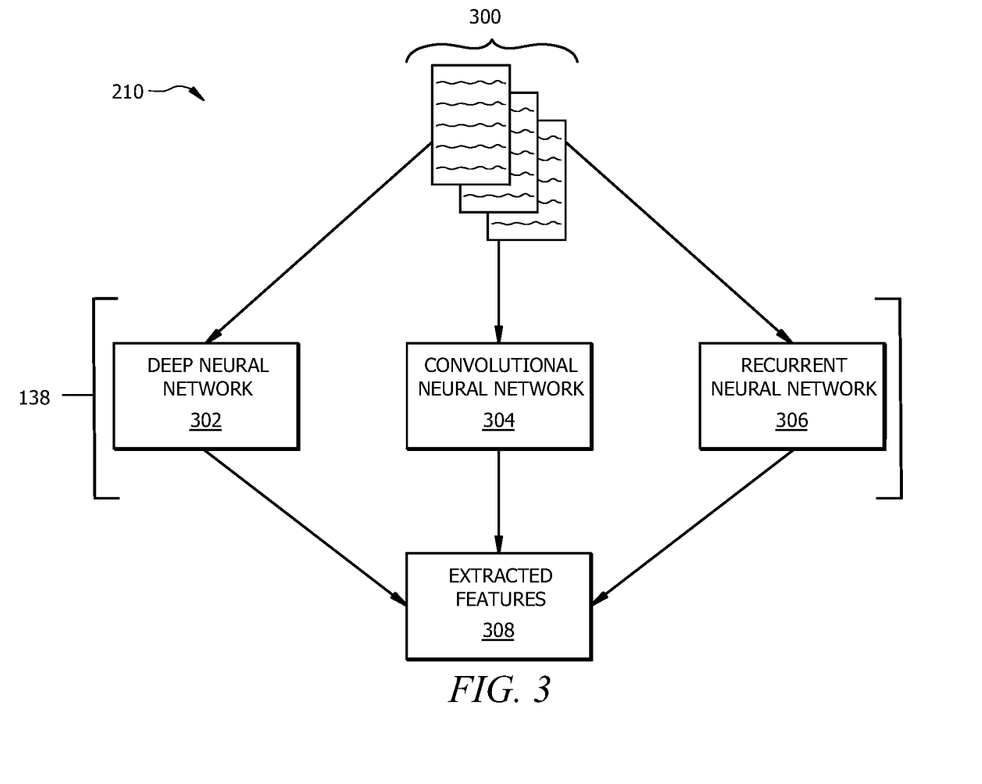
FIG. 3 is a diagram illustrating the machine learning approach to creating training data for the autoencoders from the method of FIG. 2.

At step 210, the IDR Manager 108 clusters extracted data features and uses those features to train autoencoder module 136 using deep learning module 138. This process is illustrated by FIG. 3. First, snapshots of telemetry data 300 are received by deep learning module 138. The snapshots 300 may be in graphical form, audio form, video form, or any other computer-readable form. The snapshots 300 generally comprise the status of a plurality of hardware performance metrics from the production server at the time the snapshot was taken.

Deep learning module 138 is a multimodal deep learning architecture that includes a plurality of neural networks. Various combinations of neural networks are possible. The neural network of FIG. 3 is a known example of a multimodal architecture, which uses a deep neural network 302, convolutional neural network 304, and recurrent neural network 306. The neural networks 302, 304, and 306 extract and identify features of the telemetric data from the snapshots 300. These features are then grouped using a one-class classification. In other words, the features are grouped based on whether they tend to indicate the production server 102 is operating normally or not. The grouped data is used to train autoencoder module 136 to identify abnormalities in a new snapshot 300 that is received by the IDR Manager 108 after machine learning process 202 is complete. Returning to FIG. 2, at step 212, the IDR Manager 108 determines the threshold to apply during the inferencing step, discussed below. Further details regarding the threshold determination and operation of autoencoder module 136 are provided below in the discussion of recovery process 204.

Recovery process 204 involves the analysis of one or more recovered servers 214. The recovered servers 214 are examples of production server 102 that potentially experienced a disaster. A production server 102 may at one time be an impacted server 206 and another time a recovered server 214. The distinction is that impacted server 206 are previous events used to train autoencoders, while impacted server 206 refers to a production server 102 that is presently experiencing a problem that may require disaster recovery. At step 216, a telemetry analyzer 106 collects telemetric data from the one or more recovered servers 214. Telemetry analyzer 106 then sends the telemetric data to an IDR Manager 108. At step 218, inferencing module 140 processes the telemetric data using the autoencoders trained at step 210. The inferencing step generally involves application of the trained autoencoders to the hardware telemetric data collected at step 216.

Figure 4:
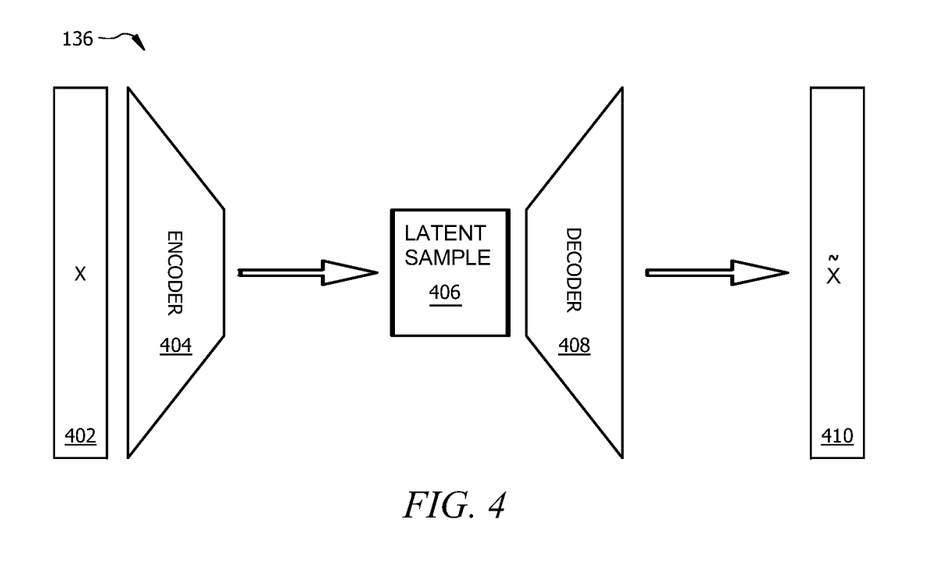
FIG. 4 is a diagram illustrating the operation of the autoencoders in the method of FIG. 2.

The inferencing process is better understood with reference to FIG. 4. This process is carried out by autoencoder module 136. FIG. 4 illustrates the general operation of autoencoders. Autoencoders are a known type of artificial neural network that learn a representation—i.e., encoding—for a data sample and a reconstruction. A data sample 402 is processed by encoder 404 to produce latent sample 406. Data sample 402 represents the hardware telemetric data collected at step 216. Latent sample 406 is a dense representation of data sample 402, which decoder 408 can convert into an output 410 that approximates data sample 402. This allows IDR Manager 108 to detect whether the data sample 402, which in the example of FIG. 2 is the hardware telemetric data collected at step 216, is normal or abnormal. This is done by determining how much output 410 differs from data sample 402. A difference that exceeds the threshold determined at step 212 is considered a disaster on the production server 102 from which data sample 402 was collected.

The threshold is determined at step 212 using a statistical heuristic. Users can adjust the heuristic to suit their system needs. For example, a user might want to set the threshold so that it is only considered a disaster if there is more than 40% difference between the output 410 and data sample 402. Alternatively, the processor 130 of IDR Manager 108 is capable of automatically assigning a threshold value by applying a statistical heuristic to the optimization of the system's hardware performance. One skilled in the art would appreciate that various statistical evaluations may be employed.

Returning to block 220 of FIG. 2, if the difference between output 410 and data sample 402 does not exceed the threshold compared to at step 218, then IDR Manager 108 determines that there is not a disaster on the production server 102 from which data sample 402 was collected. This determination does not mean that production server 102 is running without any errors. It simply means that any errors are not significant enough to crash the server or that the errors are minor enough for the production server 102 to correct itself without action from IDR Manager 108.

If it is determined instead at block 220 that the threshold is exceeded, IDR Manager 108 interprets it as a disaster on production server 102. IDR Manager 108 then proceeds to step 224 to analyze the potential root causes of the disaster. Root cause analysis module 142 accomplishes this by comparing the hardware telemetric data collected at step 216 with the root cause list 144 stored in disaster database 110. The root cause list 144 includes a catalog of previous disasters that occurred on any production server 102 analyzed by IDR Manager 108. The catalog links snapshots of hardware telemetric data collected when a disaster occurred to a bug fix script 146. The closer the match between the hardware telemetric data collected at step 216 and a set of hardware telemetric data of a snapshot stored in root cause list 144, the greater the likelihood that the bug fix script 146 linked to that snapshot will remedy the present disaster on production server 102. Root cause analysis module 142 then uses the closest matched cause to retrieve the linked bug fix script 146 from disaster database 110.

After root cause analysis module 142 finds the closest match, it proceeds to step 226 and ranks the importance of the processes running on production server 102. This involves analyzing which of three possible server arrangements between the production server 102 and backup server 104 applies. Production server 102 and backup server 104 may have a hot-hot relationship, hot-warm relationship, or hot-cold relationship. Hot—hot refers to a scenario where the production server 102 runs critical applications that cannot accept server downtime. Criticality may be determined by a user of IDR Manager 108. For example, a user may tag certain applications 122 as critical in the code of the application 122. In a hot-hot scenario, the backup server 104 can replace the production server 102 in real time.

Hot-warm refers to a scenario where the production server 102 runs sub-critical applications that can tolerate some, but not extensive, server downtime. Again, this may be determined by a user as in the case of hot-hot scenarios. In the hot-warm scenario, operations shift to backup server 104 and upgrades are executed on both production server 102 and backup server 104 that may cause some downtime. Upgrades refer to hardware and or software upgrades to the infrastructure of the servers 102 and 104 rather than just upgrades to an application 122.

Hot-cold refers to a scenario where the production server 102 runs applications that can tolerate extensive server downtime. Again, this tolerance can be programmed into the applications 122 or it can be a default for anything not identified as hot-hot or hot-warm. In the hot-cold scenario, the backup server 104 only provides basic server infrastructure while the servers are taken offline for extensive upgrades to hardware and/or software. As discussed below, the upgrades for hot-hot and hot-warm server combinations are generally automated while upgrades for a hot-cold scenario require manual intervention. In addition to examining how critical the applications are on the production server 102, the ranking step 226 may also involve evaluating how severe the disaster is. This may include evaluating the degree to which processes on a production server 102 have slowed. If, for example, the disaster affects multiple applications, then the scenario may be treated as a hot-cold scenario even if one of the affected applications is critical. The user may choose to alter the weight given to each factor in the step 226 analysis.

The IDR Manager 108 then proceeds to step 228 where it executes the bug fixe script 146 that was identified during the root cause analysis step 224. This involves different processes depending on whether the production server 102 was deemed to have a hot-hot, hot-warm, or hot-cold status at step 226. For a hot-hot scenario, the bug fix involves switching all processes of applications 122 from the production server 102 to backup server 104. The switch is nearly instantaneous so that disruption of application function is minimized. The bug fix script 146 that was identified in step 224 may then applied to production server 102 and backup server 104. This step is similar for hot-warm scenarios. Again, the processes of applications 122 are shifted from production server 102 to backup server 104. However, in the hot-warm scenario the bug fix script 146 identified in step 226 also requires technology upgrades to the production server 102 and backup server 104. These upgrades may slow performance of backup server 104, but it does not require total cessation of applications.

In contrast, a hot-cold scenario requires taking the servers offline. In that scenario, backup server 104 only provides minimal server infrastructure while new bug fix scripts 146 are generated and technology upgrades are made to the production server 102. New bug fix scripts 146 may be generated by the IDR Manager 108 or by a user. The new bug fix script 146 may be executed manually by the user or automatically by the IDR Manager 108 after the technology upgrades to the production server are complete.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for managing server disasters, the system comprising:

a first production server running one or more software applications;

a backup server, wherein the backup server contains a copy of the applications hosted on the first production server;

a first hardware processor communicatively coupled to a first memory, the first memory including executable instructions that upon execution by the first hardware processor cause the system to:

take snapshots of the first production server's telemetry, wherein the snapshots comprise a status of a plurality of hardware performance metrics from the first production server;

send copies of the snapshots to a second and a third memory;

the second memory configured to store:

a log of previous disasters on the first production server, wherein the log includes for each disaster values for a plurality of hardware performance metrics as they were captured in a particular snapshot taken by the first hardware processor at a time of the disaster;

a set of recovery scripts, wherein each script is associated with at least one disaster in the log of previous disasters, and wherein each script provides a solution for the associated disaster;

a second hardware processor communicatively coupled to the third memory, the third memory including executable instructions that upon execution by the second hardware processor cause the system to:

process the snapshots received from the first hardware processor to generate a set of features of the snapshots that indicate normal server function;

train an autoencoder using the generated set of features;

apply the trained autoencoder to a new snapshot received from the first hardware processor to generate a reconstruction of the new snapshot;

determine that the reconstruction of the new snapshot differs from the new snapshot by an amount greater than a threshold;

compare the new snapshot to the log of previous disasters stored in the second memory, to find a scenario with a closest match between hardware performance metrics in the new snapshot and hardware performance metrics associated with a disaster in the log;

retrieve, from the first memory, a recovery script associated with the closest matched scenario; and     execute the retrieved recovery script.

2. The system of claim 1, wherein the threshold is determined by the second hardware processor.

3. The system of claim 1, wherein the third memory further includes executable instructions that upon execution by the second hardware processor cause the system to:

process additional snapshots received from the first hardware processor, to generate a set of features of the additional snapshots that indicate normal server function, wherein the additional snapshots comprise a status of a plurality of hardware performance metrics from a second production server;

train an autoencoder using, in addition to the set of features generated for the first production server, the set of features generated for the second production server.

4. The system of claim 1, wherein execute the retrieved recovery script comprises:

determine that at least one application running on the first production server is critical, wherein being critical means that slowing execution of the at least one application cannot be tolerated;

switch processes running on applications on the first production server to copies of those applications hosted on the backup server; and     take the first production server offline.

5. The system of claim 1, wherein execute the retrieved recovery script comprises:

determine that no application running on the first production server is critical, wherein being critical means that slowing execution of the at least one application cannot be tolerated;

determine that an application running on the first production server is sub-critical, wherein being subcritical indicates that slowing execution of the at least one application is tolerated but that complete cessation of application execution cannot be tolerated;

switch processes running on applications on the first production server to copies of those applications hosted on the backup server; and     notify a user that upgrades need to be made to an infrastructure of the first production server and the backup server.

6. The system of claim 1, wherein execute the retrieved recovery script comprises:

determine that the applications running on the first production server are neither critical nor sub-critical, wherein being critical means that slowing execution of the at least one application cannot be tolerated, and wherein being subcritical indicates that slowing execution of the at least one application is tolerated but that complete cessation of application execution cannot be tolerated; and     take both the production and backup servers offline.

7. The system of claim 1, wherein the plurality of hardware performance metrics from the first production server are collected from hardware performance counters.

8. A method for managing server disasters, the method comprising:

receiving snapshots of a first production server's telemetry, wherein the snapshots comprise a status of a plurality of hardware performance metrics from the first production server at a time a particular snapshot was taken;

generating a set of features of the snapshots that indicate normal server function;

training an autoencoder using the generated set of features, wherein the trained autoencoder generates a reconstruction of newly received snapshots;

determining a threshold for the autoencoder to apply to reconstructions of snapshots, wherein the threshold distinguishes between server disasters and minor anomalies based on a degree of difference between new snapshots and their reconstructions;

receiving a new snapshot of the first production server's telemetry;

applying the trained autoencoder to the new snapshot to generate a reconstruction of the new snapshot;

determining that the reconstruction of the new snapshot differs from the new snapshot by an amount greater than a threshold;

comparing the new snapshot to a log of previous disasters, wherein the log includes for each disaster values for a plurality of hardware performance metrics as they were captured in a snapshot taken at a time of the disaster, to find a scenario with a closest match between a hardware performance metrics in the new snapshot and hardware performance metrics associated with a disaster in the log;
retrieving a recovery script that is linked to the closest matched scenario in the log, wherein the recovery script includes computer executable instructions for resolving the scenario; and
executing the retrieved recovery script.

9. The method of claim 8, further comprising:
processing additional snapshots, to generate a set of features of the additional snapshots that indicate normal server function, wherein the additional snapshots comprise a status of a plurality of hardware performance metrics from a second production server;
training an autoencoder using, in addition to the set of features generated for the first production server, the set of features generated for the second production server.

10. The method of claim 8, wherein executing the retrieved recovery script comprises:
determining that at least one application running on the first production server is critical, wherein being critical means that slowing execution of the at least one application cannot be tolerated;
switching processes running on applications on the first production server to copies of those applications hosted on a backup server; and
taking the first production server offline.

11. The method of claim 8, wherein executing the retrieved recovery script comprises:
determining that that no application running on the first production server is critical, wherein being critical means that slowing execution of the at least one application cannot be tolerated;
determining that an application running on the first production server is sub-critical; wherein being subcritical indicates that slowing execution of the at least one application is tolerated but that complete cessation of application execution cannot be tolerated;
switching processes running on applications on the first production server to copies of those applications hosted on a backup server; and
notifying a user that upgrades need to be made to an infrastructure of the first production server and the backup server.

12. The method of claim 8, wherein executing the retrieved recovery script comprises:
determining that the applications running on the first production server are not critical, wherein being critical means that slowing execution of the at least one application cannot be tolerated;
determining that the applications on the first production server are not sub-critical, wherein being subcritical indicates that slowing execution of the at least one application is tolerated but that complete cessation of application execution cannot be tolerated;
taking both the production and backup servers offline; and
sending a notification to a user that software on the production and backup servers needs to be manually corrected.

13. The method of claim 8, wherein the plurality of hardware performance metrics from the first production server are collected from hardware performance counters.

14. An apparatus for managing server disasters, the apparatus comprising:
a memory;
a hardware processor communicatively coupled to the memory, the hardware processor configured to:
generate a set of features from snapshots of a first production server's telemetry, wherein the snapshots comprise a status of a plurality of hardware performance metrics from the first production server at a time a particular snapshot was taken, and wherein the set of features indicate normal server function;
train an autoencoder using the generated set of features, wherein the trained autoencoder generates a reconstruction of new snapshots received by the apparatus;
apply the trained autoencoder to a new snapshot, to generate a reconstruction of the new snapshot;
determine that the reconstruction of the new snapshot differs from the new snapshot by an amount greater than a threshold;
compare the new snapshot to a log of previous disasters, wherein the log includes for each disaster a snapshot of values for a plurality of hardware performance metrics captured at a time of the disaster, to find a scenario with a closest match between a hardware performance metrics in the new snapshot and hardware performance metrics associated with a disaster in the log;
retrieve a recovery script that is linked to the closest matched scenario in the log, wherein the recovery script includes computer executable instructions for resolving the scenario; and
execute the retrieved recovery script.

15. The apparatus of claim 14, wherein the threshold is determined by the hardware processor.

16. The apparatus of claim 14, wherein the plurality of hardware performance metrics from the first production server are collected from hardware performance counters.

17. The apparatus of claim 14, wherein the hardware processor is further configured to:
process additional snapshots, to generate a set of features of the additional snapshots that indicate normal server function, wherein the additional snapshots comprise a status of a plurality of hardware performance metrics from a second production server; and
train an autoencoder using, in addition to the set of features generated for the first production server, the set of features generated for the second production server.

18. The apparatus of claim 14, wherein execute the retrieved recovery script comprises:
determine that at least one application running on the first production server is critical, wherein being critical means that slowing execution of the at least one application cannot be tolerated;
switch processes running on applications on the first production server to copies of those applications hosted on a backup server; and
take the first production server offline.

19. The apparatus of claim 14, wherein execute the retrieved recovery script comprises:
determine that that no application running on the first production server is critical, wherein being critical means that slowing execution of the at least one application cannot be tolerated;
determine that an application running on the first production server is sub-critical; wherein being subcritical indicates that slowing execution of the at least one application is tolerated but that complete cessation of application execution cannot be tolerated;

switch processes running on applications on the first production server to copies of those applications hosted on a backup server; and notify a user that upgrades need to be made to an infrastructure of the first production server and the backup server.

20. The apparatus of claim 14, wherein execute the retrieved recovery script comprises:

determine that the applications running on the first production server are not critical, wherein being critical means that slowing execution of the at least one application cannot be tolerated;

determine that the applications on the first production server are not sub-critical, wherein being subcritical indicates that slowing execution of the at least one application is tolerated but that complete cessation of application execution cannot be tolerated;

take both the production and backup servers offline; and send a notification to a user that software on the production and backup servers needs to be manually corrected.

\* \* \* \* \*